2,157,367

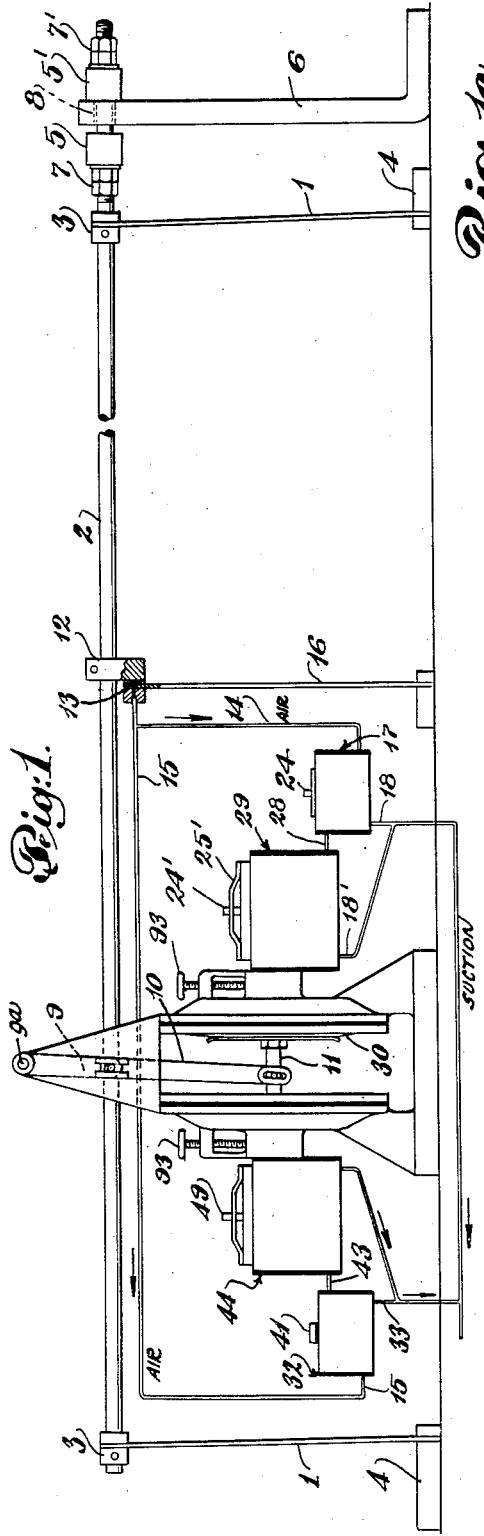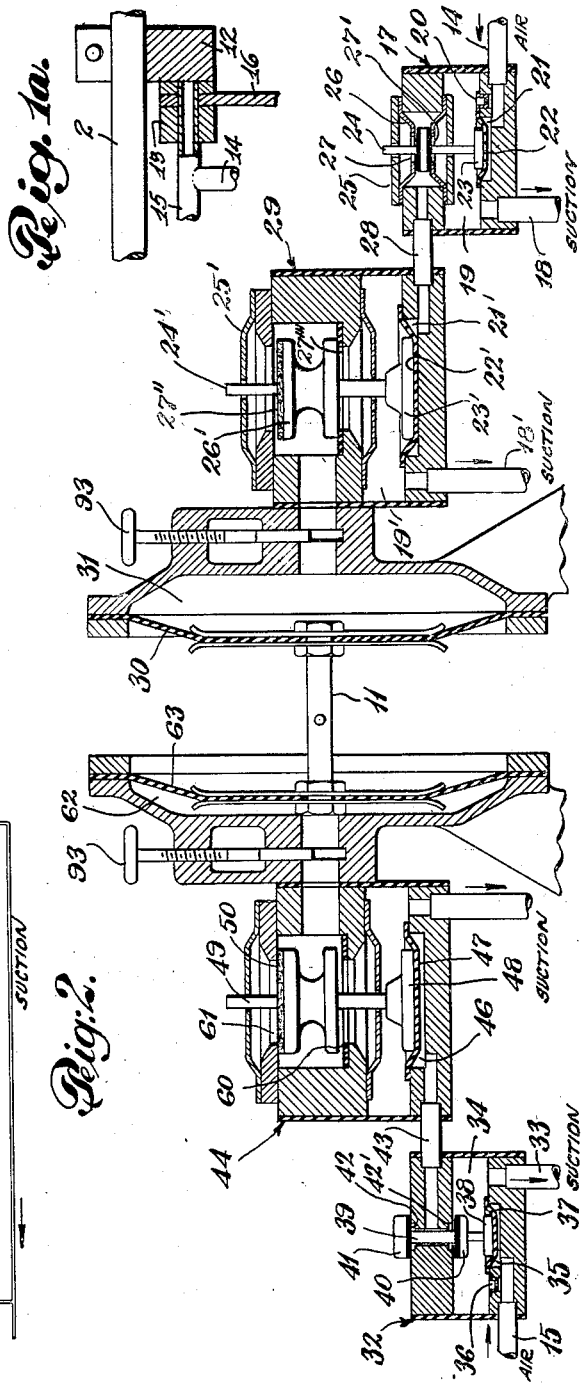

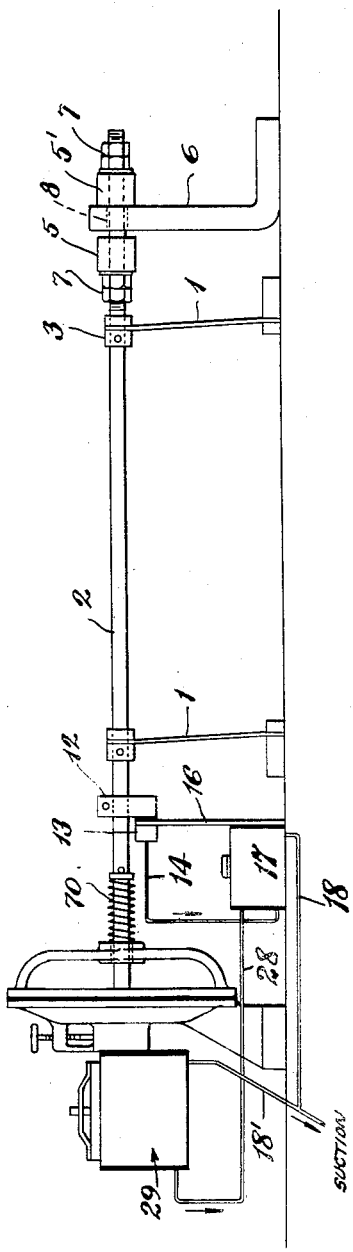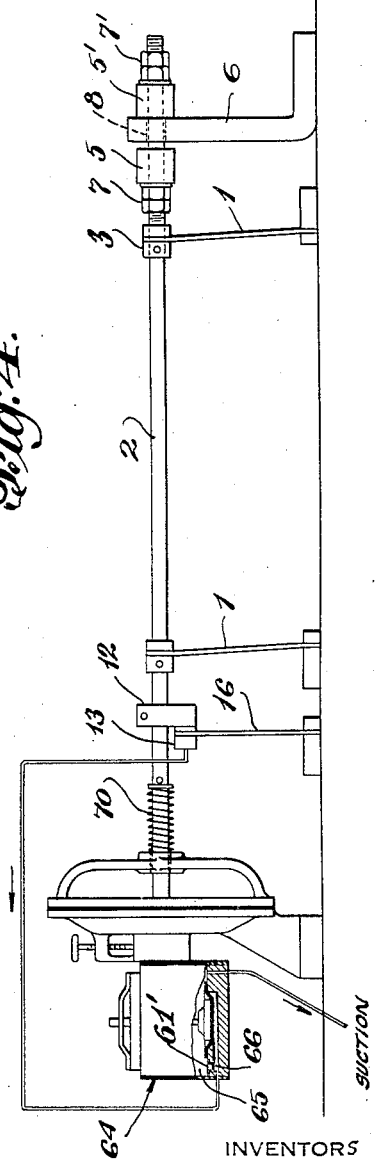

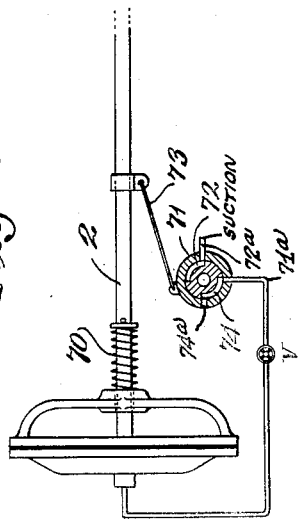
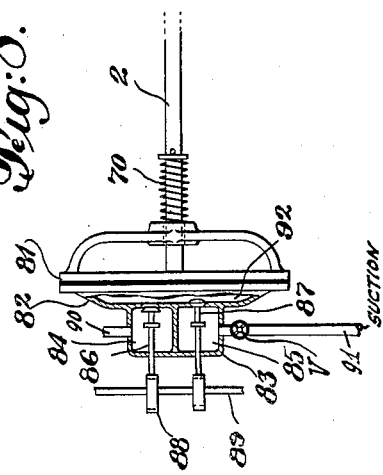
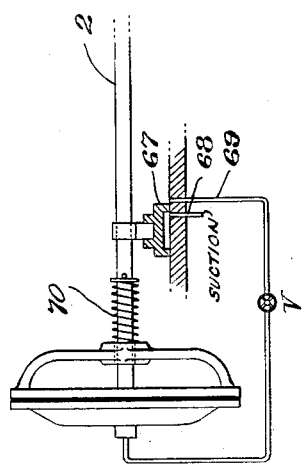
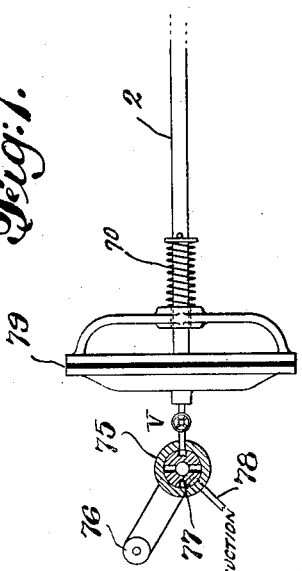
INVENTORS
Sterling W Warner &
Lynn B. Case
BY C. Campbell Hunich
ATTORNEY Patented May 9, 1939

UNITED STATES PATENT OFFICE 2,157,367

PNEUMATIC VIBRATING MECHANISM

Sterling W. Warner, Somerville, and Lynn B. Case, New Brunswick, N. J., assignors to John Waldron Corporation, New Brunswick, N. J., a corporation of New Jersey Application March 12, 1936, Serial No. 68,568

3 Claims. (Cl. 121—48)

This invention relates to pneumatic vibrating mechanisms.

In many arts, a vibrating mechanism is an essential part of a machine. For instance, in the coating of paper for many years brushes were satisfactorily used to finish the coating operation. Such brushes, however, when used had a limitation as to the speed of vibration which caused the time limitation on the coating process so that with the coating means speeded up to decrease the cost of coating, the brushes could not be speeded up. For this reason, in high speed coating, brushes had to be discontinued. Another limiting factor in the use of brushes was the shock element where the vibration or the movement of the brushes was mechanically produced. Under high speeds and with heavy brushes, the shock and vibration set up by the moving brushes is so great as to necessitate extremely heavy foundations for the machine to prevent injury to the machine and even to the actual building.

High speed operation mechanical means for vibrating elements may generally be said to have the following inherent defects:

The moving parts acquire sufficient momentum to create shocks at the end of the strokes and must be of sufficient weight whereby vibrational effects are set up in the machine as well as in the vibrating parts. With the electrical operating mechanism for vibrating parts, we have found, that high speeds are difficult of attainment due to the lag in the electrical control mechanism.

One of the objects of this invention is to provide a pneumatic mechanism for a vibrating element that will permit of high speed vibration of the element.

Another object of the invention is to provide a vibrating mechanism that will be of relatively light weight and one wherein high speed vibration may be accomplished without the resultant shocks to the machine or building.

Still another object of the invention is to provide a quick acting vibrating mechanism that will be positive in action without dead centers.

Still another object of the invention is to provide an efficient, economical, pneumatic mechanism capable of vibrating an element at relatively high speeds and one that is adapted for easy and quick change of the speed or length of stroke.

Referring to the drawings:

Figure 1 is a view in elevation of a pneumatic vibrating mechanism embodying the principles of our invention.

Figure 1a is an enlarged view of a portion of the control mechanism.

Figure 2 is a longitudinal, sectional view of Figure 1.

Figure 3 is a longitudinal view in elevation of a modified form of device.

Figure 4 is a longitudinal view in elevation of a modified form of pneumatic vibrating mechanism.

Figure 5 is a detail view of a modified form of pneumatic vibrating mechanism partly in section.

Figure 6 is a detail view of a modified form of a pneumatic vibrating mechanism partly in section.

Fig. 7 is a detail view of a modified form of a pneumatic vibrating mechanism partly in section.

Figure 8 is a detail view of a modified form of a pneumatic vibrating mechanism partly in section.

In carrying out our invention, we provide supports 1 which are fixed and secured to the vibrating rod 2 by clamps 3. The brushes previously referred to are suitably attached to the vibrating rod 2 between the clamp 3 and the plate 12. These supports are preferably made of hickory, although we do not desire to be limited in this particular. By utilizing a resilient material of light weight and yet sufficiently strong for the purposes, two things are accomplished:

(1) Reduction of mass, thereby permitting of easier and quicker reversal of change of direction.

(2) By supporting the vibrating rod on the supports 1 in fixed relationship at the end of supports 1, bearing friction is avoided, a material element in high speed vibration. High speed bearings are difficult to lubricate and the skin friction of the lubricant is a material element.

The other ends of hickory supports 1 are held by blocks 4 in the bed of the machine. Collars 5, 5', in cooperation with standard 6, form limiting stops. The collars 5, 5', are preferably of rubber or other resilient material and are adjustable on vibrating rod 2 by nuts 7, 7'. By this means the stroke may be varied by screwing nuts 7, 7', in either direction as required. Standard 6 has an opening 8 sufficiently large so that when rod 2 is inserted therethrough in assembling, it does not contact. The opening 8 is shown by dotted lines. Referring to Figure 1, two arms 9 and 10 (one directly behind the other of this figure and the arm 10 being longer than arm 9) are fixed to a shaft 9a. The lower end of the arm 9 is connected to the rod 2 and the lower end of the arm 10 is connected to the diaphragm rod 11. Vibration of the rod 11 causes oscillation of the shaft 9a through the medium of the arm 10 and vibration of the rod 2 is effected by oscillation of the shaft 9a through the medium of the arm 9. Assuming that rod 2 has reached the end of a stroke and is about to return, then cover plate 12 secured to rod 2 has closed the opening 13 of pneumatic lines 14 and 15. A member having an opening 13 is supported by resilient member 16 which is similar to supports 1 in construction and material. The reason for such construction is that the slight resiliency of support 16 is desirable to provide the proper time element for the reversal of the valves. Opening 13 being closed, shuts off atmospheric air to primary valve 17. Primary valve 17 is connected by pipe 18 to a source of vacuum. Pipe 18 leads into chamber 19 which has a small opening 20 connecting with the inlet of atmospheric line 14 and with chamber 21. Chamber 21 is covered by a diaphragm 22 of flexible material. Resting on diaphragm 22 is a foot 23 for valve stem 24. Valve stem 24 is guided by valve guides 25 and valve seats 26 have ports 27, 27', therein, port 27 being opened to atmosphere. Therefore, as the atmospheric air is shut off by the closing of opening 13 and as the vacuum is continuously operating, any air is exhausted through opening 20 from chamber 21. The latter is of relatively small size, thereby causing valve stem 24 to be depressed thus opening port 27 to the atmosphere. Atmospheric air then passes through connection 28 to secondary valve 29. This valve is of similar construction having vacuum pipe 18', chamber 19', diaphragm 22', and valve stem 24'. Foot 23' is carried by valve stem 24' and rests upon diaphragm 22'. Valve 26' is adapted to cover orifice 27" to the atmosphere or 27''' communicating with chamber 19'. The admission of atmospheric air through connection 28 causes the raising of valve stem 24' by reason of the pressure within chamber 21' thereby causing valve 26' to close orifice 27" and opening chamber 19' through orifice 27''' to act upon diaphragm 30 whereby the vacuum now present in chamber 31 in back of diaphragm 30 causes diaphragm shaft 11 to move to the right.

Simultaneously, with the closing of opening 13, the opposite action occurs in primary valve 32, that is, the atmospheric air being shut off and the vacuum effect 33 being in operation, chamber 34 is evacuated thereby evacuating chamber 35 through orifice 36 connecting chambers 35 and 34. The evacuation of chamber 35 permits the depression of diaphragm 37 and in consequence valve foot 38 is lowered. Valve stem 39 has valves 40 and 41 thereon. The lowering of valve stem 39 causes valve 41 to seat and cover port 42 to the atmosphere and opens port 42' by the lowering of valve 40, thereby permitting the vacuum effect in chamber 34 to operate through connection 43 on secondary valve 44. Thus it will be seen that the shutting off of the atmospheric air creates in primary valve 17 a pressure effect on secondary valve 29 while in the case of primary valve 32 a vacuum effect is created on secondary valve 44. The vacuum effect on valve 44 causes the extraction or evacuation of air from chamber 46 through connection 43. The extraction of air from chamber 46 causes diaphragm 47 to become depressed moving foot 48 downwardly as well as stem 49 and valve 50 downwardly to cover orifice 60 and open orifice 61, thereby admitting atmospheric air into chamber 62 back of diaphragm 63. Thus, we see that diaphragm 63 will have atmospheric air entering chamber 62 to allow movement of diaphragm 63 to the right while diaphragm 30 will have the air being evacuated from 31 to assist in the movement of shaft 11 to the right. When the mechanism is going in one direction the vacuum will be on one side, and when going in the other direction it will be on the opposite side so that the vibrating rod 2 will be motivated in both directions.

Upon the uncovering of port 13, a reversal of the operation of the valves takes place. We then have atmospheric air entering primary valves 17 and 32, causing in the case of valve 17 the closing of the atmospheric port 27 by reason of the raising of valve stem 24 by diaphragm 22, while in valve 32, the atmosphere raising diaphragm 37 opens atmospheric port 42, thereby we have in secondary valve 29 the evacuation of chamber 21' while in valve 44 we have air at atmospheric pressure admitted to chamber 46 so that the mospheric air pressure in valve 44 closes the atmospheric port 61 creating a vacuum effect in chamber 62 and the consequent movement of diaphragm 63 to the left while atmospheric air is admitted in chamber 31 permitting movement of diaphragm 30 to the left with consequent movement of shaft 11 to the left. The moving of shaft 11 motivates vibrating rod 2.

Referring to Figure 3, this modification is identical with the form shown in Figure 1 except that the pneumatic means move vibrating rod 2 in one direction and rod 2 is returned in the other direction by mechanical means such as by a spring 70. In other words, the spring takes the place of one set of primary and secondary valves and the operating diaphragm.

Referring to Figure 4, the pneumatic operating mechanism consists of a single valve 64 that is similar in construction to valve 29 except that chamber 65 is connected by means of a small opening or bleed 61' with chamber 66. In this way, it is possible to eliminate the primary valve 17 shown in Figure 3. The advantage of the two valve mechanism lies in the fact that quicker action can be had since the chambers can be more readily evacuated.

In Figures 1, 2, 3 and 4, the valve mechanisms may be classed as poppet valves. Various modifications may be made in the type of valve. For instance, in Figure 5, we have shown a sliding valve wherein the movement of rod 2 causes valve 67 to cover or uncover atmospheric air opening 69 or vacuum opening 68. The uncovering of the vacuum opening causes movement of sliding valve 67 in one direction and the uncovering of the air opening 69 in conjunction with spring 70 causes movement in the opposite direction. A valve V is provided for controlling the air opening 69.

Referring to Figure 6, rod 2 is again caused to be motivated in one direction by an oscillatory pneumatic valve 71. A link 73 connects the rod 2 to the core of the valve 71 so that the core is oscillated upon reciprocation of the rod. In the valve casing are provided a vacuum opening 72 and an air opening 74, while a pipe 71a leads from the valve casing to the pneumatic chamber, this pipe being provided with a valve V. The core is provided with passageways 72a and 74a by which the chamber may be put into communication either with the vacuum opening 72 or the atmospheric opening 74 upon oscillation of the valve core. Movement of the rod 22 in one direction is effected by the spring 70 and in the other direction by the application of vacuum through the valve 71.

Figure 7 shows a modification wherein a continuously rotating valve is utilized and driven from an outside source. This modification has certain advantages and disadvantages but it permits the use of our invention where it is desirable to have the vibrating rod controlled by an outside source rather than the rod itself actuating the vibrating mechanism. The core of valve 75 is provided with a pair of channels 77 leading to atmosphere and a pair of channels communicating through an axial passageway with a pipe 78 leading to a vacuum source. One of the channels is arranged to register with a port in the valve casing communicating with the chamber for the diaphragm 99 so that such chamber is alternately subjected to vacuum and atmospheric pressure. The core of valve 75 is continuously rotated from an outside source 76 at the desired speed of rotation causing the diaphragm 79 to be alternately subjected to vacuum and atmospheric pressure with resulting movement of the diaphragm 77 and rod 2 to the left when the diaphragm is subjected to vacuum and to the right when the diaphragm is subjected to atmospheric pressure, the spring 70 assisting in movement of the rod 2 to the right.

Referring to Figure 8, diaphragm 81 is similarly connected to vibrating rod 2 as in the previous views (Figs. 3 to 7). The supporting case 82 has a housing 83 divided into two chambers 84, 85. In each chamber poppet valves 86, 87, are operated from without housing 83 by cams 88 on cam shaft 89. A port 90 admits atmospheric air and a port 91 communicates with a vacuum source. Thus, as cam shaft 89 is rotated, cams 88 move valves 86, 87, to create behind diaphragm 81 either a vacuum or to fill the chamber 92 with air. When a vacuum is created behind diaphragm 81, rod 2 is moved in one direction and when atmospheric air is admitted to chamber 92 rod 2 is moved in the opposite direction by spring 70.

The modifications shown in Figures 5, 6, 7 and 8, are readily adapted for use in connection with pressure air in place of vacuum by merely substituting a source of pressure supply in place of a source of vacuum supply. In the same modifications if pressure air is utilized, the springs must be altered since the movement of the diaphragm by the pressure air is in the opposite direction. The speed of operation in Figures 1, 2, 3 and 4, can be controlled by gate valves 93 and V in the other figures. The length of stroke is controlled by the distance between collars 5, 5', which are easily adjustable on rod 2. It should be noted, that the speed is adjustable during operation.

It will thus be seen that we have invented a mechanism wherein bearing friction of the vibrating rod may be removed, that is of quick action and wherein the moving parts are of relatively light weight which can be controlled both as to speed and length of stroke, and wherein the reversal of direction can be either controlled by the movement of the vibrating rod or by any other suitable means.

What we claim is:

1. A device of the character described comprising a pair of lightweight resilient bars supported at one end, a reciprocatory rod fixed to the free ends of said bars for simultaneous movement therewith, pneumatic means for effecting reciprocation of said rod, suction-producing means connected to said pneumatic means, a vent to atmosphere communicating with said suction-producing means, a third lightweight resilient member supported at one end, a duct fixed to the free end of said member and constituting a vent to atmosphere communicating with said suction-producing means and a plate mounted on said bar to close said vent in one position of said rod.

2. A device of the character described comprising a pair of lightweight resilient bars supported at one end, a reciprocating rod fixed to the free ends of said bars for simultaneous movement therewith, pneumatic means for effecting reciprocation of said rod, suction-producing means, means connecting said pneumatic means to said suction-producing means, a third lightweight resilient bar supported at one end, a duct fixed to the free end of said member and constituting a vent to atmosphere communicating with said pneumatic means, and a plate carried by said bar to close said vent in one position of the bar.

3. A device of the character described comprising a pair of lightweight resilient bars supported at one end, a reciprocatory rod fixed to the free ends of said bars for simultaneous movement therewith, resilient means for effecting movement of said rod in one longitudinal direction, pneumatic means for effecting reciprocation of said rod in the opposite longitudinal direction, suction-producing means connected to said pneumatic means, a third lightweight resilient bar supported at one end, a duct fixed to the free end of said bar and constituting a vent to atmosphere communicating with said suction-producing means, and a plate mounted on said bar to close said duct in one position of said bar.

STERLING W. WARNER.
LYNN B. CASE.